United States Patent
Singh et al.

(12) 
(10) Patent No.: US 6,713,532 B2
(45) Date of Patent: Mar. 30, 2004

(54) SOLID POLYMER DISPERSIONS AND METHOD FOR THEIR PREPARATION

(75) Inventors: Navjot Singh, Rye, NY (US); Joseph Michael Anostario, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/377,353

(22) Filed: Feb. 28, 2003

(65) Prior Publication Data

US 2003/0162902 A1 Aug. 28, 2003

Related U.S. Application Data

(60) Division of application No. 10/139,968, filed on May 7, 2002, now Pat. No. 6,646,052, which is a continuation-in-part of application No. 10/079,730, filed on Feb. 21, 2002, now Pat. No. 6,573,342, which is a continuation-in-part of application No. 09/696,088, filed on Oct. 26, 2000, now abandoned, which is a division of application No. 09/218,925, filed on Dec. 22, 1998, now Pat. No. 6,194,518, which is a continuation-in-part of application No. 08/959,256, filed on Oct. 29, 1997, now abandoned, which is a continuation-in-part of application No. 08/742,536, filed on Nov. 1, 1996, now abandoned.

(51) Int. Cl.$^7$ .............................. C08J 3/00; C08K 9/00; C08K 9/06; C08L 83/00; C08F 8/00
(52) U.S. Cl. ..................... 523/201; 523/200; 523/205; 523/206; 523/209; 523/212; 523/223; 525/100; 525/101; 525/106
(58) Field of Search ................................. 523/200, 201, 523/205, 206, 209, 212, 223; 525/100, 101, 106

(56) References Cited

U.S. PATENT DOCUMENTS

| | | | |
|---|---|---|---|
| 3,301,813 A | | 1/1967 | Dahms et al. |
| 3,737,479 A | * | 6/1973 | Haaf |
| 3,824,208 A | | 7/1974 | Link et al. |
| 4,153,639 A | | 5/1979 | Vaughn |
| 4,483,886 A | | 11/1984 | Kowalski |
| 4,822,834 A | | 4/1989 | Blevins |
| 5,100,958 A | | 3/1992 | Fuhr et al. |
| 5,153,238 A | | 10/1992 | Bilgrien et al. |
| 5,391,594 A | | 2/1995 | Romenesko et al. |
| 5,412,014 A | | 5/1995 | Romenesko |
| 5,929,168 A | * | 7/1999 | Ikkala et al. |

FOREIGN PATENT DOCUMENTS

| | | |
|---|---|---|
| GB | 2318794 | 5/1998 |
| WO | WO 93/09183 | 5/1993 |

* cited by examiner

*Primary Examiner*—Patrick D. Niland
(74) *Attorney, Agent, or Firm*—Andrew J. Caruso; Patrick K. Patnode

(57) ABSTRACT

Solid blends of rubbery polymers and amorphous or crystalline polymers, said blends being free-flowing at temperatures lower than the glass transition temperature or crystalline melting temperature of the amorphous or crystalline polymer, are prepared by intimate mixing procedures. In general, said mixing conditions include high shear conditions sufficient to convert polymer A to dispersed particles coated with polymer B and produce a free-flowing powder blend.

22 Claims, No Drawings

SOLID POLYMER DISPERSIONS AND METHOD FOR THEIR PREPARATION

The application is a division of application Ser. No. 10/139,968, filed May 7, 2000 Now U.S. Pat. No. 6,646,052, which is a continuation-in-part of application Ser. No. 10/079,730, filed Feb. 21, 2002 Now U.S. Pat. No. 6,573,342, which in turn is a continuation-in-part of application Ser. No. 09/696,088, filed Oct. 26, 2000 Now Abandoned, which in turn is a division of application Ser. No. 09/218,925, filed Dec. 22, 1998, now U.S. Pat. No. 6,194,518, which in turn is a continuation-in-part of application Ser. No. 08/959,256, filed Oct. 29, 1997, now abandoned, which in turn is a continuation-in-part of application Ser. No. 08/742,536, filed Nov. 1, 1996, now abandoned, which are incorporated herein by reference.

BACKGROUND OF THE INVENTION

This invention relates to polymer dispersions in solid form and a method for their preparation. More particularly, it relates to the preparation of polymer blends in solid form.

The use of elastomeric (i.e., rubbery) polymers as additives in blends comprising other polymers is known. Various rubbery polymers are useful as impact modifiers, flame retardants and additives conferring other properties on blends in which they are incorporated. While the dispersion of liquid additives in polymeric powders is well known and previously documented by Dahms et al. (U.S. Pat. No. 3,301,813), a uniform and fine dispersion of rubbery polymers in thermoplastics to form dry free-flowing powders has not been reported.

U.S. Pat. Nos. 3,824,208, 5,153,238, 5,391,594 and 5,412,014 describe the incorporation of fillers such as silica in rubbery polymers to form compositions which exist as free-flowing particles. However, the surface chemistry of the filler in some cases can result in degradation of the matrix polymer.

Conventional approaches for obtaining free-flowing powders with elastomeric components include the use of block copolymers, core-shell copolymers or graft copolymers with thermoplastics. Copolymerization or grafting of glassy/crystalline thermoplastic prevents agglomeration of the rubbery component and enables convenient addition of these impact modifiers as free-flowing powders in extrusion equipment for melt processing. Such approaches however do not provide a cost effective solution for preparing free-flowing polymeric dispersions.

It is difficult, however, to prepare homogeneous blends of rubbery polymers with other resins, owing to the relative intractabilities of said rubbery polymers and the slow progress of dispersion of said polymer in the blend. Examples of some alternative approaches for obtaining free-flowing powders include mixing a dispersion of an organic thermoplastic polymer with an emulsion of a silicone resin as taught by Fuhr et al. in U.S. Pat. No. 5,100,958. This method is once again not cost effective since it involves a subsequent adjustment of pH for coagulation followed by isolation and drying of the coagulate. Another method proposed by Vaughn in U.S. Pat. No. 4,153,639 involves mixing the resin and the rubbery additive (in this case silicone gum) in a liquid medium having a component which vaporizes readily. The liquid medium is contacted with flowing live steam in a conduit and the mixture is fed into a closed chamber from which the superheated, vaporized liquid components are removed and a particulate blend is extracted.

Other practical limitations in melt-melt blending of thermoplastics with rubbery polymers include the inability to disperse the rubber phase adequately in the thermoplastic melt using conventional processing equipment due to excessive shear heating in extruders, for example, and a morphological balance between drop break up (dispersion) and the subsequent coalescence of the dispersed particles.

Some applications like powder coating require the availability of the thermoplastic resin blend in a powdery form. One route for the formation of thermoplastic blend powders involves high temperature melt extrusion of the various melt components followed by grinding of the thermoplastic pellets to obtain a free-flowing powder. The ability to directly form uniform thermoplastic blends with fine morphologies at lower processing temperatures can provide a direct, cost-effective and simpler process.

SUMMARY OF THE INVENTION

The present invention facilitates the formation of polymer blends as described herein above. In particular, it makes it possible to prepare blends which are solid and free-flowing, said blends comprising high and often major proportions of rubbery materials such as polyorganosiloxanes and synthetic elastomers, said blends also containing another resinous constituent. Among the blends that can be produced are those useful as products in their own right and those useful as master batches suitable for incorporation as additives in other polymer compositions.

In one of its aspects, the present invention provides a method for preparing a blend, said blend comprising: a polyorganosiloxane (A) having at least one of a glass transition temperature ($Tg_a$) or a melting temperature ($Tm_a$), a vinylaromatic polymer (B) having at least one of a glass transition temperature ($Tg_b$) or melting temperature ($Tm_b$), wherein $Tg_a < Tg_b$ when polymers A and B are amorphous, $Tm_a < Tm_b$ when both polymers A and B are crystalline, $Tg_a < Tm_b$ when polymer A is amorphous and polymer B is crystalline, and $Tm_a < Tg_b$ when polymer A is crystalline and polymer B is amorphous, which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a free-flowing blend. Also provided is a composition prepared by the aforementioned method.

DETAILED DESCRIPTION

In some embodiments the present invention provides a method wherein $Tg_a$ is below about 160° C., in other embodiments below about 50° C., and in still other embodiments below about minus 10° C. In some embodiments the present invention provides a method wherein polymer B is crystalline. In still other embodiments the present invention provides a method wherein polymer B is amorphous and $Tg_b$ is above about 100° C. It is generally known to those skilled in the art that many, but not all, polymers as commonly obtained comprise a mixture of amorphous and crystalline fractions. In some particular polymers an amorphous phase predominates, while in other particular polymers a crystalline phase may provide a significant fraction of the total polymer. In other particular embodiments polymer A and polymer B are typically immiscible and incompatible with each other.

Provided in yet another embodiment is a method wherein polymers A and B are mixed in a rotary blade mixer at a blade tip velocity in the range of about 1,000–15,000 cm/sec.

In another embodiment the instant invention provides a composition comprising a blend of polymer A having glass transition temperature ($Tg_a$) and/or a melting temperature ($Tm_a$), polymer B having glass transition temperature ($Tg_b$) or melting temperature ($Tm_b$), wherein $Tg_a<Tg_b$ when polymers A and B are amorphous, $Tm_a<Tm_b$ when both polymers A and B are crystalline, $Tg_a<Tm_b$ when polymer A is amorphous and polymer B is crystalline, and $Tm_a<Tg_b$ when polymer A is crystalline and polymer B is amorphous, said composition being produced by the process of intimately mixing said polymers at a suitable temperature between the lower of $Tg_a$ and $Tm_a$ and the higher of $Tg_b$ and $Tm_b$, for a time and under shear conditions sufficient to convert polymer A to dispersed particles coated with polymer B and produce a free-flowing blend in the form of a powder. In still another embodiment the instant invention provides a composition comprising a blend of polymer A having glass transition temperature ($Tg_a$) and/or a melting temperature ($Tm_a$), polymer B having glass transition temperature ($Tg_b$) or melting temperature ($Tm_b$), wherein $Tg_a<Tg_b$ when polymers A and B are amorphous, $Tm_a<Tm_b$ when both polymers A and B are crystalline, $Tg_a<Tm_b$ when polymer A is amorphous and polymer B is crystalline, and $Tm_a<Tg_b$ when polymer A is crystalline and polymer B is amorphous, said composition being produced by the process of intimately mixing said polymers at a suitable temperature between the lower of $Tg_a$ and $Tm_a$, and the value of $Tg_b$, for a time and under shear conditions sufficient to convert polymer A to dispersed particles coated with polymer B and produce a free-flowing blend in the form of a powder. In various embodiments blends of the present invention are produced in solid form with no need for quenching or cooling said blend, as is typically necessary when using common melt processing equipment. In some particular embodiments the free-flowing blend is prepared by the method of the invention which does not involve melting of polymer B. In other particular embodiments polymer B may be plasticized, for example by mixing with at least one other polymer or additive which is at least partly miscible with polymer B such that the Tg of the mixture is lower than the Tg of polymer B itself, in which case the temperature range for preparing blends by the present method is at a suitable temperature between the lower of $Tg_a$ and $Tm_a$, and the value of Tg for the mixture of polymer B with at least one other polymer or additive which is at least partly miscible with polymer B. An example of a plasticized mixture of a polymer B is a mixture of a polyphenylene ether such as poly-2,6-dimethyl-1,4-phenylene ether with a polystyrene, which mixture typically has a Tg in between that of the polyphenylene ether and the polystyrene dependent upon, among other factors, the relative proportions of the two polymers in the mixture.

The free-flowing powders prepared by the method of the present invention have a mean particle size in one embodiment in a range of between about 50 microns and about 4000 microns, in another embodiment in a range of between about 100 microns and about 3000 microns, in another embodiment in a range of between about 200 microns and about 2000 microns, in another embodiment in a range of between about 200 microns and about 1500 microns, in another embodiment in a range of between about 250 microns and about 1200 microns, in another embodiment in a range of between about 300 microns and about 1000 microns, and in still another embodiment in a range of between about 400 microns and about 900 microns. In a particular embodiment a free flowing powder blend may be distinguished from a pelletized extrudate made in a melt process which pellets typically have at least one dimension greater than about 4000 microns.

In some embodiments the present invention provides a composition wherein $Tg_a$ is below about 160° C., in other embodiments below about 50° C., in other embodiments below about 0° C., in other embodiments below about minus 10° C., in other embodiments below about minus 30° C., in other embodiments below about minus 50° C., and in still other embodiments below about minus 80° C. In some embodiments the present invention provides a composition wherein polymer B is crystalline. In still other embodiments the present invention provides a composition wherein polymer B is amorphous and $Tg_b$ is above about 100° C.

In various embodiments the present invention provides a method and composition wherein polymer A is a polyorganosiloxane, a polyurethane rubber, a polysulfide rubber, an epoxide rubber, or a polyolefin-comprising rubber. Within the present context a polyolefin-comprising rubber is a natural or synthetic rubbery (or elastomeric) polymer which comprises structural units derived from at least one olefinic monomer, and includes natural rubber, polyisoprene, 1,4-polyisoprene, cis-1,4-polyisoprene, epoxidized natural rubber, chlorinated natural rubber, grafted natural rubber, butadiene rubber, polybutadiene, ethylene-propylene rubber (sometimes known as EP rubber), ethylene-propylene-diene modified rubber (sometimes known as EPDM rubber), ethylene-vinyl acetate rubber, styrene-butadiene rubber, poly(butadiene-co-styrene), styrene-ethylene butylene-styrene rubber (SEBS), styrene-isoprene-styrene rubber, styrene-isoprene rubber, styrene-isoprene-butadiene rubber, butyl rubber, poly(isobutylene-co-isoprene), nitrile rubber, hydrogenated nitrile rubber, poly(butadiene-co-acrylonitrile), chloroprene rubber, polychloroprene, neoprene, fluorocarbon elastomers, poly(vinylidene fluoride-co-hexafluoropropene), acrylic rubbers, poly(ethyl acrylate), poly(butyl acrylate), poly(isobutyl acrylate), poly(n-butyl acrylate), ethyl acrylate copolymers with at least one other crosslinkable monomer, butyl acrylate copolymers with at least one other crosslinkable monomer, acrylate-butadiene rubber, ethylene-acrylic rubber, ethylene-methyl acrylate rubber, polynorbornene, polydicyclopentadiene, polyoctenamer, chlorobutyl rubber, bromobutyl rubber, chlorinated polyethylene, and chlorosulfonated polyethylene. In addition, suitable polyolefin-comprising rubber includes ethylene/alpha-olefin copolymers wherein the alpha-olefin is selected from the group consisting of $C_3$ to $C_{20}$ alpha olefins with some particular alpha-olefins being propylene, butene, hexene, and octene. Such copolymers are often synthesized using metallocene catalyst systems. Such polymers are commercially available from a wide variety of sources.

In some particular embodiments polymer A comprises at least one polyorganosiloxane, especially polydiorganosiloxanes. Examples of polydiorganosiloxanes include polydialkylsiloxanes such as polydimethylsiloxane and their fluorinated derivatives such as poly(trifluoropropylmethylsiloxane). Polydialkylsiloxanes modified at one or more chain-ends, such as vinyl-terminated polydimethylsiloxane, may also be employed.

Polymers useful as polymer B may be amorphous or crystalline. When amorphous, they are characterized by their $Tg_b$ value; when crystalline, the crystalline melting temperature ($Tm_b$) may be more significant. Thus, there is a temperature span in which the method of the invention may be conducted which is above the glass transition temperature ($Tg_a$) or melting point ($Tm_a$) of polymer A and below the higher of the glass transition temperature ($Tg_b$) or crystalline melting temperature ($Tm_b$) of polymer B.

Illustrative polymers useful as polymer B include olefin polymers such as polyethylene and polypropylene, polycarbonates, bisphenol A polycarbonate, poly(vinyl chloride), polyesters including thermoplastic aromatic polyesters such as poly(ethylene terephthalate), poly (trimethylene terephthalate), poly(cyclohexanedimethanol terephthalate), polyarylate, and poly(butylene terephthalate), and thermoplastic aliphatic polyesters such as poly(1,4-cyclohexanedimethyl-1,4-cyclohexanedicarboxylate); vinylaromatic polymers including polystyrene and styrene-acrylonitrile copolymers, polyphenylene ethers, polyimides (including polyetherimides), polyethersulfones, polyetherketones, polyetheretherketones, and polyarylene sulfides. In some embodiments polymers useful as polymer B are those having glass transition temperatures above about 150° C. In particular embodiments polymers useful as polymer B comprise polyphenylene ethers, such as, but not limited to, poly(2,6-dimethyl-1,4-phenylene ether) and poly(2,6-dimethyl-co-2,3,6-trimethyl-1,4-phenylene ether).

Elastomeric examples of polymer A employed in embodiments of the present invention are those which have a relatively low glass transition temperature $Tg_a$. The value of $Tg_a$ is generally below about 25° C. and may be below 0° C. For example, polydiorganosiloxane gums useful in the invention may have Tg values down to about minus 127° C. with a melting point of about minus 40° C. Polymer A typically has a high viscosity, in some embodiments in the range of about 500,000 to about 20,000,000 centipoise at a shear rate on the order of $10 \sec^{-1}$, however polymers having viscosities as low as 5,000 and above about 20,000,000 may also be used. In some embodiments examples of polymer A have a number average molecular weight of greater than about 10,000 and in other embodiments greater than about 20,000. In various embodiments elastomeric examples of polymer A have an oil swell value (as measured by ASTM 2000–90) of in some embodiments greater than 120 volume % at 70° C., in other embodiments greater than 130 volume % at 70° C., in other embodiments greater than 140 volume % at 70° C., in other embodiments in a range of between 2 and 80 volume % at 100° C., and in still other embodiments in a range of between 3 and 110 volume % at 150° C. In some embodiments examples of polymer A have a Mooney viscosity in the range of between about 20 and about 100, in other embodiments in the range of between about 20 and about 90, in other embodiments in the range of between about 40 and about 90, and in still other embodiments in the range of between about 40 and about 70.

The compositions of the invention may include additives such as fillers, plasticizers, compatibilizers, lubricants, UV screeners, flame retardants, antistatic agents, antioxidants, and the like. In particular embodiments compositions may optionally include inorganic fillers such as silica filler and treated silica filler. For some particular applications it may be desirable for compositions of the invention to exclude inorganic fillers such as silica filler and treated silica filler.

In a particular embodiment of the invention, polymers A and B are mixed under high shear conditions, at a temperature higher than $Tg_a$ or $Tm_a$ and lower than the higher of $Tg_b$ and $Tm_b$. In another particular embodiment of the invention, polymers A and B are mixed under high shear conditions, at a temperature higher than $Tg_a$ or $Tm_a$ and lower than the value of $Tg_b$. In another particular embodiment of the invention, polymers A and B are mixed under high shear conditions, at a temperature higher than at least one of $Tg_a$ or $Tm_a$ and lower than the value of $Tg_b$. Mixing is generally conducted in one or more discrete steps rather than continuously as in an extruder, and under high shear conditions sufficient to produce a composition of the type described hereinafter. High shear mixers of this type are known in the art and include Waring blenders, Henschel mixers, Drais mixers and mixer-granulators of the type manufactured by Littleford Bros., Florence, Ky.

In general, both polymers are charged in their entirety before mixing begins. It is within the scope of the invention, however, to add polymer A and polymer B incrementally, so as to maintain conditions under which a dispersion of polymer A in solid polymer B is formed.

It has been shown in some embodiments that initially, a dispersion of gum (polymer A) in solid (polymer B) is formed. During the high shear mixing process, a progressive breakdown of the particle size of polymer A occurs. Simultaneously, the particles of polymer B coat those of polymer A to form a solid, particulate blend which is a solid dispersion of polymer A in polymer B and which is free-flowing at temperatures below the higher of $Tg_b$ and $Tm_b$.

The proportions of polymers A and B, as well as the mixing time and conditions, are chosen to ensure that all particles of polymer A are dispersed and coated. If the mixing time is too long, polymer A will form particles so small that the quantity of polymer B will be inadequate to fully coat them, whereupon reagglomeration will take place immediately or upon storage.

Thus, suitable proportions and mixing conditions can be determined by simple experimentation. Weight ratios of polymer B to polymer A are in various embodiments in the range of about 1:1 to about 5:1. In the case of a rotary blade mixer, blade tip velocities in the range of about 1,500 to about 15,000 cm/sec are generally adequate to produce the required high shear mixing.

The blending temperature is not particularly critical. In one embodiment the blending temperature is between the lower of $Tg_a$ and $Tm_a$ and the higher of $Tg_b$ and $Tm_b$. In another embodiment the blending temperature is between the lower of $Tg_a$ and $Tm_a$ and the value of $Tg_b$. In a particular embodiment where $Tg_a$ is below about 0° C. and $Tg_b$ or $Tm_b$ is above about 150° C., blending at moderate temperatures in the range of about 20° C. to about 75° C., and especially at ambient temperature of about 25° C., is satisfactory. In other embodiments, polyethylene with a $T_m$ of about 110° C. may be employed as polymer A with a polyphenylene ether having a Tg of 210° C. as polymer B, if blending is at a temperature typically around 150° C. In various embodiments the blending temperature is below both $Tg_b$ and $Tm_b$.

Following the blending operation of the present invention, it is sometimes desirable to extrude and to pelletize the polymer blend of the invention to form a storable material. Depending on the constituents employed, this storable material may itself be a useful polymer composition or may be a master batch or an additive for incorporation into other polymer compositions.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. All parts are by weight.

EXAMPLE 1

A mixture of 25 parts of a vinyl-terminated polydimethylsiloxane gum (Tg about minus 127° C. & Tm about minus 40° C.) having a viscosity of about 3.9 million centipoise at a shear rate of about 10.14 sec$^{-1}$ and 100 parts of a poly(2,6-dimethyl-1,4-phenylene ether) having a $Tg_b$ of about 210° C. having an intrinsic viscosity of 0.4 dl/g (in chloroform at 25° C.) was mixed at room temperature (about 25° C.) in a Waring blender at high speed for 10 minutes. The desired blend was obtained as a free-flowing powder, with 2.36 parts of unblended silicone remaining. The blend was capable of being molded, as shown by a compression molding operation at 300° C. Mixing time and shear rate are critical for controlling the amount of unblended silicone.

EXAMPLE 2

The procedure of Example 1 was repeated, except that mixing was conducted in a Henschel mixer at a tip speed of 4,000 cm/s and ambient temperature. The product was a free-flowing powder capable of extrusion and molding with no detectable unblended silicone.

EXAMPLE 3

The procedure of Example 2 was employed to prepare a free-flowing powder of 4 parts of polyethylene powder ($Tm_b$ about 120° C., and $Tg_b$ about minus 80° C.) and 1 part of methyl-stopped polydimethylsiloxane gum (Tg about minus 127° C. & Tm about minus 40° C.) having a viscosity of about 3,900,000 centipoise at 10.14 sec$^{-1}$. The blend was capable of extrusion and molding.

EXAMPLE 4

The procedure of Example 3 was repeated, substituting 4 parts of polystyrene powder ($Tg_b$ about 100° C.) for the polyethylene powder. A similar product was obtained.

EXAMPLE 5

The procedure of Example 4 was repeated, substituting 4 parts of bisphenol A polycarbonate powder ($Tg_b$ about 162° C.) for the polyethylene powder. A similar product was obtained.

EXAMPLE 6

The procedure of Example 1 was repeated, using a blend of 1 part each of the polyphenylene ether ($Tg_b$ about 210° C.) and an ethylene-propylene rubber ($Tg_a$ about minus 80° C.). A well dispersed, free-flowing powder with a shelf life of at least one month was obtained. The blend was capable of extrusion and molding.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. patents and U.S. patent applications cited herein are incorporated herein by reference.

What is claimed is:

1. A method for preparing a blend, said blend comprising:
   a polyorganosiloxane (A) having at least one of a glass transition temperature ($Tg_a$) or a melting temperature ($Tm_a$),
   a vinylaromatic polymer (B) having at least one of a glass transition temperature ($Tg_b$) or melting temperature ($Tm_b$), wherein
   $Tg_a < Tg_b$, when polymers A and B are amorphous,
   $Tm_a < Tm_b$, when both polymers A and B are crystalline,
   $Tg_a < Tm_b$, when polymer A is amorphous and polymer B is crystalline, and
   $Tm_a < Tg_b$, when polymer A is crystalline and polymer B is amorphous, which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a free-flowing powder blend.

2. The method according to claim 1 wherein $Tg_a$ is below about 160° C.

3. The method according to claim 2 wherein $Tg_a$ is below about 50° C.

4. The method according to claim 3 wherein $Tg_a$ is below about minus 10° C.

5. The method according to claim 2 wherein polymer B is crystalline.

6. The method according to claim 3 wherein polymer B is amorphous and $Tg_b$ is at least about 100° C.

7. The method according to claim 1 wherein the polyorganosiloxane comprises a polydimethylsiloxane.

8. The method according to claim 1 wherein the vinylaromatic polymer (B) comprises a polystyrene.

9. The method according to claim 1 wherein said polymers are mixed in a rotary blade mixer at a blade tip velocity in the range of about 1,000 to about 15,000 cm/sec.

10. The method of claim 1 wherein the polyorganosiloxane has a viscosity in a range of between about 5,000 and about 20,000,000 centipoise at a shear rate of about 10$^{-1}$.

11. A method for preparing a blend, said blend comprising:
    a polydimethylsiloxane (A) having at least one of a glass transition temperature ($Tg_a$) or a melting temperature ($Tm_a$),
    a polystyrene powder (B) having at least one of a glass transition temperature ($Tg_b$) or melting temperature ($Tm_b$), wherein
    $Tg_a < Tg_b$, when polymers A and B are amorphous,
    $Tm_a < Tm_b$, when both polymers A and B are crystalline,
    $Tg_a < Tm_b$, when polymer A is amorphous and polymer B is crystalline, and
    $Tm_a < Tg_b$, when polymer A is crystalline and polymer B is amorphous,
    which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a free-flowing powder blend.

12. A composition comprising a blend of:
    a polyorganosiloxane (A) having at least one of a glass transition temperature ($Tg_a$) or a melting temperature ($Tm_a$),
    a vinylaromatic polymer (B) having at least one of a glass transition temperature ($Tg_b$) or melting temperature ($Tm_b$), wherein
    $Tg_a < Tg_b$, when polymers A and B are amorphous,
    $Tm_a < Tm_b$, when both polymers A and B are crystalline,
    $Tg_a < Tm_b$, when polymer A is amorphous and polymer B is crystalline, and
    $Tm_a < Tg_b$, when polymer A is crystalline and polymer B is amorphous,
    produced by the process of intimately mixing said polymers at a suitable temperature between the lower of $Tg_a$ and $Tm_a$ and the value of $Tg_b$ for a time and under shear conditions sufficient to convert polymer A to dispersed particles coated with polymer B and produce a free-flowing powder blend.

13. The composition according to claim 12 wherein $Tg_a$ is below about 160° C.

14. The composition according to claim 13 wherein $Tg_a$ is below about 50° C.

15. The composition according to claim 14 wherein the $Tg_a$ is below about minus 10° C.

16. The composition according to claim 12 wherein polymer B is crystalline.

17. The composition according to claim 14 wherein polymer B is amorphous and $Tg_b$ is at least about 100° C.

18. The composition according to claim 12 wherein the polyorganosiloxane comprises a polydimethylsiloxane.

19. The composition according to claim 12 wherein the vinylaromatic polymer (B) comprises a polystyrene.

20. The composition of claim 12 wherein said polymers are mixed in a rotary blade mixer at a blade tip velocity in the range of about 1,000 to about 15,000 cm/sec.

21. The composition of claim 12 wherein the polyorganosiloxane has a viscosity in a range of between about 5,000 and about 20,000,000 centipoise at a shear rate of about $10^{-1}$.

22. A composition comprising a blend of:

a polydimethylsiloxane (A) having at least one of a glass transition temperature ($Tg_a$) or a melting temperature ($Tm_a$), a polystyrene powder (B) having at least one of a glass transition temperature glass transition temperature ($Tg_b$) or a melting temperature ($Tm_b$), wherein $Tg_a < Tg_b$ when polymers A and B are amorphous, $Tm_a < Tm_b$ when both polymers A and B are crystalline, $Tg_a < Tm_b$ when polymer A is amorphous and polymer B is crystalline, and $Tm_a < Tg_b$ when polymer A is crystalline and polymer B is amorphous, produced by the process of intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a free-flowing powder blend.

* * * * *